United States Patent [19]

Ito et al.

[11] Patent Number: 4,730,512

[45] Date of Patent: Mar. 15, 1988

[54] ENGINE CRANKSHAFT STRUCTURE

[75] Inventors: Eiji Ito, Nagoya; Susumu Fukazawa, Okazaki, both of Japan

[73] Assignee: Toyota Jidosha Kabushiki Kaisha, Aichi, Japan

[21] Appl. No.: 919,591

[22] Filed: Oct. 17, 1986

Related U.S. Application Data

[63] Continuation of Ser. No. 664,041, Oct. 23, 1984, abandoned.

[51] Int. Cl.$^4$ ............................................... F16C 3/04
[52] U.S. Cl. ....................................... 74/595; 74/603; 123/192 R
[58] Field of Search ............... 74/603, 595; 27/6; 123/192 R, 192 B

[56] References Cited

U.S. PATENT DOCUMENTS

| | | | |
|---|---|---|---|
| 1,303,000 | 5/1919 | Weinhardt | 74/603 |
| 1,592,237 | 7/1926 | Walker | 74/603 |
| 1,705,165 | 3/1929 | Twyman et al. | 74/603 |
| 2,632,340 | 3/1953 | Dolza et al. | 74/603 |
| 3,045,507 | 7/1962 | Turlay | 74/603 |
| 3,266,118 | 8/1966 | Drew | 29/6 |
| 3,308,680 | 3/1967 | Sherrick | 74/603 |
| 3,673,651 | 7/1972 | Stewart | 74/603 X |
| 3,815,682 | 12/1957 | Kolbe et al. | 74/603 |
| 3,817,980 | 12/1957 | Eberhard | 74/603 |
| 4,046,028 | 9/1977 | Vachris | 74/603 X |
| 4,517,933 | 5/1985 | Yasutake | 123/192 B X |
| 4,519,344 | 5/1985 | Ohyama et al. | 74/603 X |
| 4,552,104 | 11/1985 | Hara et al. | 74/603 X |

*Primary Examiner*—Gary L. Smith
*Assistant Examiner*—Rodney M. Lindsey
*Attorney, Agent, or Firm*—Kenyon & Kenyon

[57] ABSTRACT

A crankshaft for a V-6 type of internal combustion engine having longitudinally spaced journals and crank pins connected by a series of nine arms numbered from the front end to the rear end of the crankshaft is provided with counterweights on the first, second fifth, eighth, and ninth arms only. A line between a longitudinal axis of the crankshaft and an axis of a forwardmost crank pin defines, with the longitudinal axis, a reference plane. The centers of gravity of the first and ninth counterweights lie in the reference plane on opposite sides of the longitudinal axis and balance each other. The centers of gravity of the second and eighth counterweights are disposed counterclockwise and clockwise in the same quadrants, respectively, from positions that are 150 degrees and 30 degrees clockwise from the reference plane, when the crankshaft is viewed from the front. Preferably, the centers of gravity of the second and eighth counterweights are located 135 degrees and 45 degrees, respectively, clockwise from the reference plane. The fifth counterweight balances the second and eighth counterweights.

8 Claims, 13 Drawing Figures

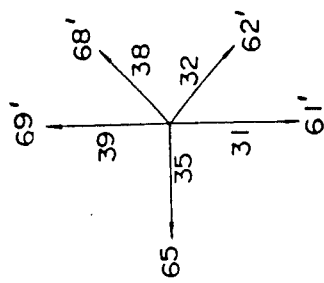
FIG. 4
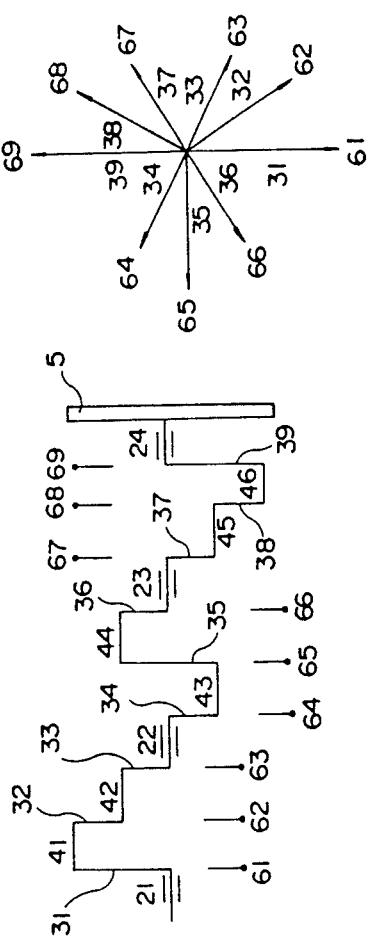
FIG. 3 PRIOR ART
FIG. 2 PRIOR ART

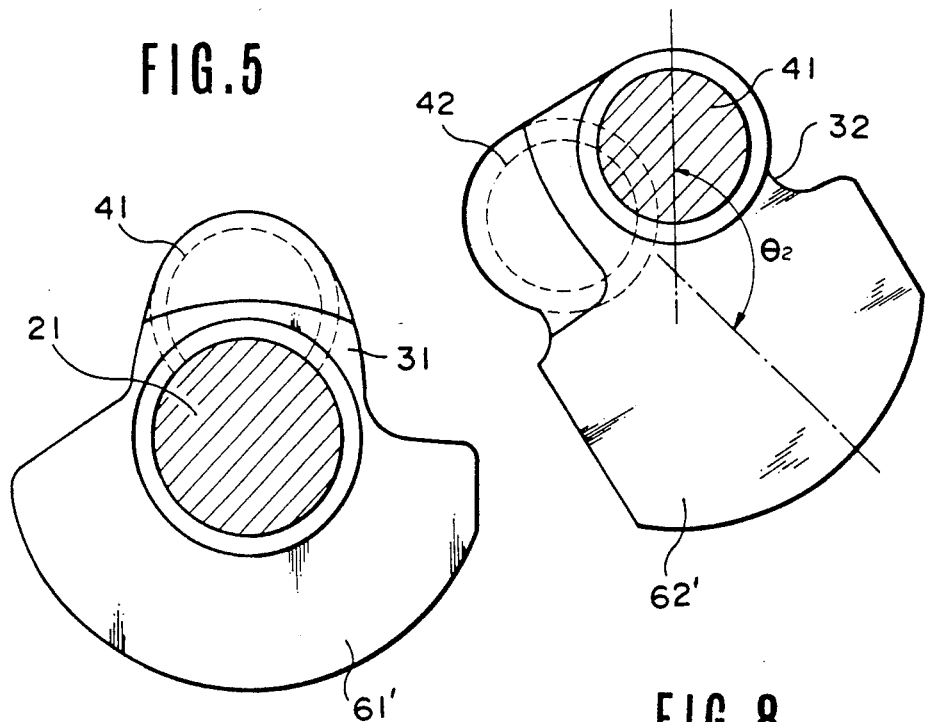
FIG. 5
FIG. 6
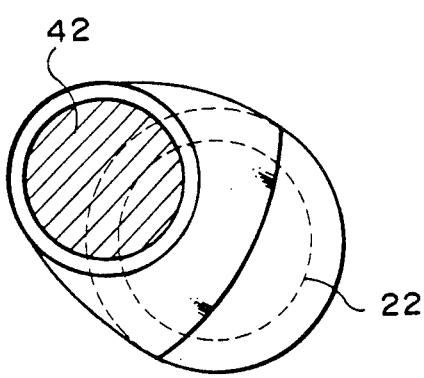
FIG. 7
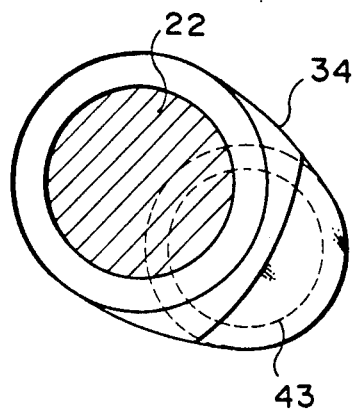
FIG. 8

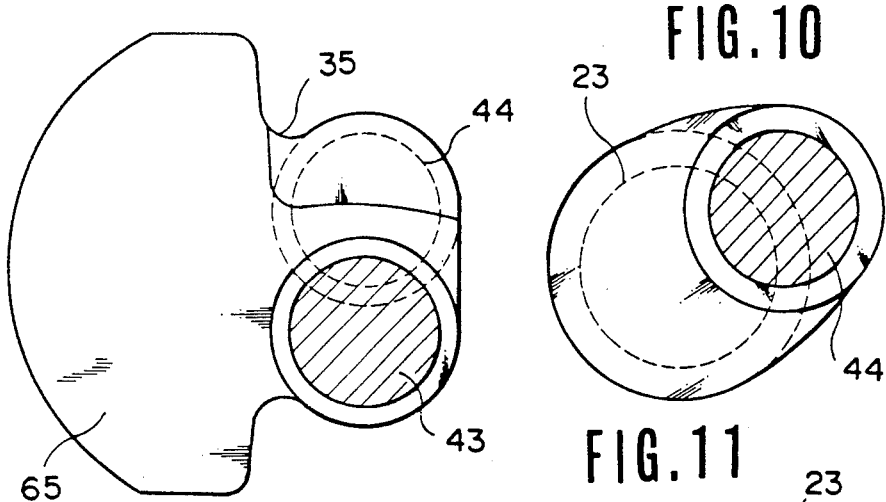
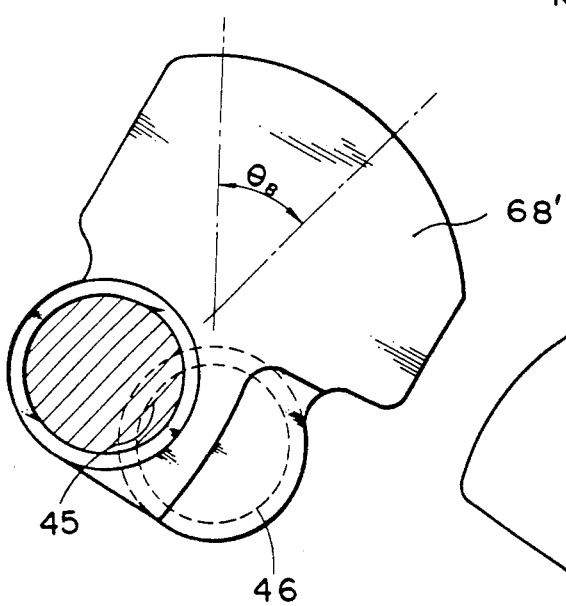
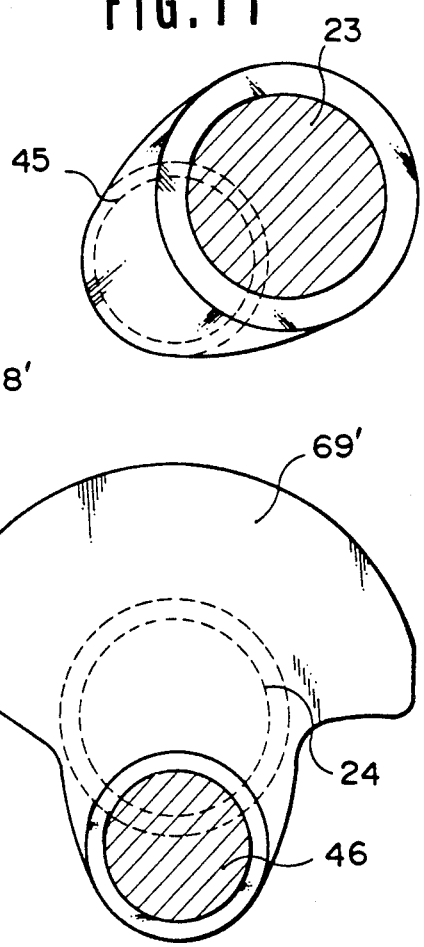
FIG. 9
FIG. 10
FIG. 11
FIG. 12
FIG. 13

ENGINE CRANKSHAFT STRUCTURE

This is a continuation of application Ser. No. 664,041, filed Oct. 23, 1984 and now abandoned.

BACKGROUND OF THE INVENTION

1. Field of the Invention:

The present invention relates to techniques for reducing the weight of and intensifying the strength of a crankshaft which is mounted in a V-6 type engine for a small-, intermediate- or large-sized automobile.

2. Description of the Prior Art:

As is well known, automobiles are provided with various types of engine. A small-, intermediate- or large-sized car is provided with, for example, a so-called V-6 type engine in which six cylinders are arranged such that adjacent cylinders form a V shape at an angle of 60°. The crankshaft of this type of engine is similar to that of FIG. 1, but includes additional counterweights 63, 64, 66, and 67 coupled to, respectively, arms 33, 34, 36 and 37, as indicated in FIG. 2.

More specifically, the crankshaft 1 is provided with first to fourth journals 21, 22, 23, 24, from the left-hand side to the right-hand side of FIG. 1, which correspond to respective cylinder-block bearings. Pins 41, 42, 43, 44, 45, 46 corresponding to respective connecting rods are integrally connected to the crankshaft 1 between the respective adjacent journals through first to ninth arms 31, 32, 33, 34, 35, 36, 37, 38, 39.

It is to be noted that the rear portion of the fourth journal 24, which is at the terminating end of the crankshaft 1, is integrally formed with a mounting surface 6 for mounting a flywheel 5.

The so-called nine-balance arrangement as viewed in the lateral direction of the crankshaft 1 in which nine counterweights are employed may schematically be shown as in FIG. 2, while the schematic arrangement as viewed in the axial direction of the crankshaft 1 may be as shown in FIG. 3.

The mass of each of the counterweights which are provided as shown in FIG. 2 in order to balance the inertia couple produced by the rotating and reciprocating mass is represented by the vector of inertia force in FIG. 3. More specifically, the first and ninth counterweights 61, 69 whose vectors are opposite in direction to each other are equivalently balanced by each other. The second, fifth and eighth counterweights 62, 65, 68 are equivalently arranged such as to cross each other at 120° and therefore are similarly balanced by each other. Moreover, the third and sixth counterweights 63, 66 and the fourth and seventh counterweights 64, 67 are equivalently arranged in axial symmetry with each other with respect to the arm 35 such that the third and seventh counterweights 63, 67 cross each other at 60° and the fourth and sixth counterweights 64, 66 cross each other at 60°; therefore, the pairs of counterweights 63, 66 and 64, 67 are similarly balanced by each other. Thus, the balance between the corresponding counterweights is reliably kept.

As described above, the conventional crankshaft structure is advantageous in that the balance between the corresponding counterweights is ideally kept and that the crankshaft structure can well afford to bear large surface pressure and also to resist, a large bending and shearing stress. The conventional crankshaft structure, however, has an extremely large weight owing to the fact that all the arms are provided with counterweights so as to be fully balanced. For this reason, the natural frequency of torsional vibration of the crankshaft cannot adequately be increased, resulting disadvantageously in an increase in torsional vibration in the high speed region (engine). Moreover, the fact that the crankshaft structure has a large weight is unfavorable in terms of responsiveness to acceleration and disadvantageously deteriorates the fuel consumption rate.

SUMMARY OF THE INVENTION

In view of the above-described problem with the prior art in regard to the excessive weight of the counterweights provided on the crankshaft of an engine for an automobile, it is a primary object of the present invention to provide an excellent engine crankshaft structure which is useful in the drive system utilization field in the automotive industry, by making the best use of the above-described advantage of the conventional crankshaft structure that it can well afford to bear large surface pressure and to resist a large bending and shearing stress and by minimizing the number of counterweights by which the required balance can be kept, thereby to allow the weight of the crankshaft to be reduced as much as possible, and optimally positioning the center of gravity of each counterweight, thereby to better the torsional vibration level.

BRIEF DESCRIPTION OF THE DRAWINGS

FIG. 2 is a schematic illustration of the arrangement of journals, pins, arms and counterweights on a crankshaft in accordance with the prior art as viewed in the lateral direction thereof, showing the balance between the counterweights;

FIG. 3 is a schematic illustration of the arms and counterweights of the crankshaft shown in FIG. 2 as viewed in the axial direction thereof, showing the balance between the counterweights;

FIG. 4 is a schematic illustration of the arms and counterweights of the crankshaft shown in FIG. 1, viewed in the axial direction thereof, showing the balance between the counterweights; and FIGS. 5 to 13 are sectional views respectively taken along the lines V—V to XIII—XIII of FIG. 1.

DESCRIPTION OF THE PREFERRED EMBODIMENT

Figure 1:
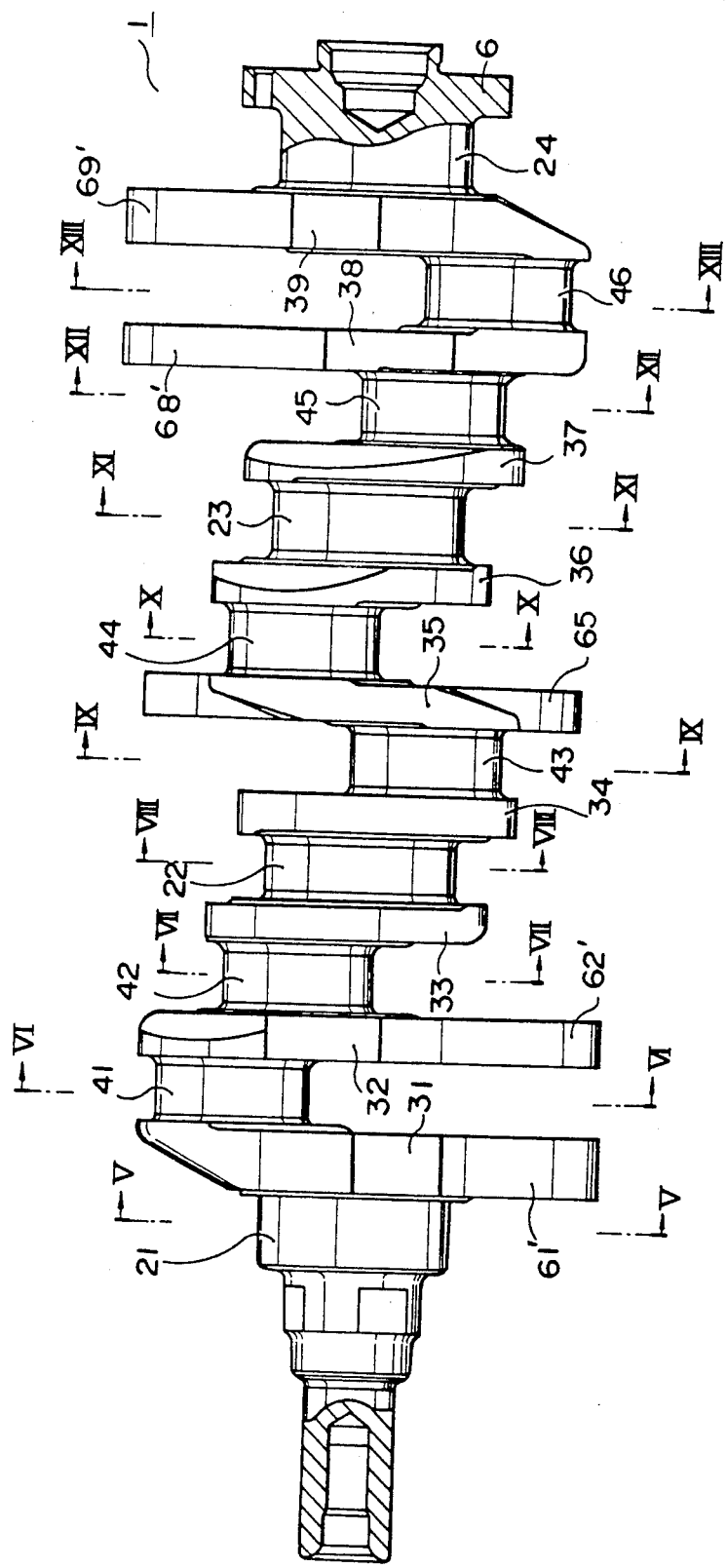
FIG. 1 is a partly-sectioned schematic side elevational view of a crankshaft according to the present invention.

One embodiment of the present invention will be described hereinunder with reference to the drawings infra FIG. 4. It is to be noted that the same portions in the Figures infra FIG. 4 as those in FIGS. 1 to 3 are denoted by the same reference numerals as those in FIGS. 1 to 3.

As shown in FIG. 4, in this embodiment of the invention, the third, fourth, sixth and seventh arms 33, 34, 36, 37 in the nine arms are not provided with any counterweight. The counterweights 61', 69' respectively provided on the first and ninth arms 31, 39 are made equal to each other in configuration, weight and section modulus such as to be self-balancing. As to the second, fifth and eighth arms 32, 35, 38, the second and eighth arms 32, 38 are arranged in axial symmetry with each other with respect to the arm 35 and are provided with the counterweights 62', 68' which are made equal to each other in configuration, weight and section modulus such as to be self-balancing in relation to the fifth arm 35 and its counterweight 65'.

Thus, unlike the conventional arrangement shown in FIG. 3 in which the counterweights 61, 62, 63, 69, 68, 67 are arranged at a spacing angle of 30° so as to be balanced, the arrangement in accordance with the invention is not provided with the counterweights 63', 67'. For this reason, the levels of bending stresses relative to the arms 32, 38 are undesirably increased if the positions and directions of the counterweights 62', 68' as viewed in the axial direction of the crankshaft 1 are left as shown in FIG. 3.

In the invention, therefore, the counterweight 62' is, as shown in FIG. 6, arranged such as to be upward with respect to the corresponding conventional counterweight 62 in FIG. 3 by 15°, which is a half of the angle 30°, for arrangement of the conventionally provided counterweights 63', 67', when the first pin 41 is at its uppermost position. On the other hand, the counterweight 68' is, as shown in FIG. 12, arranged such as to be 15° downward with respect to the corresponding conventional counterweight 68 in FIG. 3 when the first pin 41 is at its uppermost position. To be more specific, the vector directions of conventional counterweights 62 and 68 in FIG. 3 are 150° and 30°, respectively, as measured clockwise from the zero degree position of counterweight 69. Consequently, the vector directions of counterweights 62' and 68' are 135° (15° upward from vector 62) and 45° (15° downward from vector 68), respectively. By this arrangement, it is made possible to balance the arms with a bending stress level similar to that in the conventional nine-balance crankshaft shown in FIG. 3.

The respective directions and configurations of the arms and their counterweights are such as those shown in FIGS. 5 to 13 which are front elevational views thereof.

The counterweight 62' is, as shown in FIG. 6, arranged such as to be located in the fourth quadrant at the position $\theta_2$ of 135° with its center of gravity below the axis of the crankshaft 1 when the pin 41 is at its uppermost position. On the other hand, the counterweight 68' is, as shown in FIG. 12, is arranged such as to be located in the first quadrant at the position $\theta_8$ of 45° with its center of gravity above the axis of the crankshaft 1 when the pin 41 is at its uppermost position.

It is to be noted that the angles of the counterweights 62', 68' may be determined in accordance with a particular design, provided that the counterweights 62', 68' are respectively in the fourth and first quadrants when the pin 41 is at its uppermost position, and are able to keep the balance between the arms concerned despite the omission of the counterweights 63, 67.

FIGS. 7, 8, 10, 11 respectively show the arrangements of the arms 33, 34, 36, 37 which are not provided with any counterweight.

As to the weight of each of the counterweights: the weights of the first and ninth counterweights, including their corresponding arms, are the largest; the weights of the third, fourth, sixth and seventh counterweights (which are constituted only by the arms) are the smallest; and the weights of the second, fifth and eighth counterweights, including their corresponding arms) are intermediate therebetween.

With the above-described arrangement, as the engine (not shown) is operated and consequently the crankshaft 1 is rotated, the corresponding arms and counterweights are accurately balanced as described above. Accordingly, the crankshaft 1 can, be maintained at a bending stress level similar to that of the conventional nine-balance crankshaft and therefore is rotated without any abnormality.

Since the third, fourth, sixth and seventh arms 33, 34, 36 and 37 are not provided with any counterweight, the natural frequency of torsional vibration of the crankshaft 1 is increased correspondingly, so that it is possible to smoothly increase the speed of the engine as high as the high-speed region thereof.

Further, the crankshaft 1 can well afford to bear large surface pressure and to resist a large bending and shearing stress even in the high speed region engine by properly designing the crankshaft 1.

Furthermore, since the rotating mass of the second and eighth counterweights and that of the fifth counterweight are balanced, the crankshaft is rotated in accordance with the expectations of a particular design without any abnormality.

As has been described above, the present invention offers the following advantageous effects:

Basically, the invention makes it possible to reduce the numer of counterweights mounted on the crankshaft and therefore permits the crankshaft to be greatly reduced in weight. Accordingly, the natural frequency of torsional vibration of the crankshaft can be increased, so that it becomes advantageously possible to operate the engine in a higher-speed region thereof.

Further, it is possible to reduce the damper mass with the reduction in weight of the crankshaft, and the material cost is lowered by virtue of the reduction in weight of both, resulting advantageously in a lowering of the production cost.

Thus, not only the engine performance but also the fuel consumption rate are improved by the reduction in weight of the crankshaft. Moreover, it is advantageously possible to improve the transient performance of the engine during acceleration and the damping performance of the engine.

The invention also offers the following advantage: Even if no counterweight is provided on at least one of a plurality of arms which are provided both in front and at the rear of the midmost arm between the journals respectively located at the forwarding and terminating ends of the crankshaft, the balance between inertia couple or inertial forces is not lost, and the balance between turning moments is not at all lost as a whole. Thus, there is, advantageously, no change in the crankshaft function.

Additionally, since the crankshaft has a simple structure, it is easy to carry out maintenance and inspection; therefore, the crankshaft offers favorable benefits in increased serviceablity.

Further, the invention offers a secondary merit in that the shift of the engine frequency to a higher region makes it possible to substantially quieten the noise of the body and compartment of a car in the low- and intermediate-frequency regions.

Furthermore, the counterweight of the arm, which is on the outer side of and is closest to the arm which is located on the forward side of the crankshaft and is not provided with any counterweight, is arranged such as to be downward with respect to the horizontal level of the axis of the crankshaft when the first pin is at its uppermost position, while the counterweight of the arm, which is on the outer side of and is closest to the arm which is on the rearward side of the crankshaft and is not provided with any counterweight is arranged such as to be upward with respect to the horizontal level of the axis of the crankshaft when the first pin is at its uppermost position. Thus, the bending stress level of the arms is lowered, so that it is advantageously possible to ensure the same smooth rotation of the crankshaft as that of the conventional crankshaft in which all the arms are provided with respective counterweights.

What is claimed is:

1. An engine crankshaft having a front end, a rear end, and a longitudinal axis extending from said front end to said rear end, the crankshaft comprising:

a plurality of longitudinally spaced journals coaxial with said longitudinal axis and a plurality of crank pins each having an axis spaced from and parallel to said longitudinal axis, at least one crank pin being disposed longitudinally between adjacent journals, and a line between the longitudinal axis and the axis of a forwardmost one of said crank pins defining, with said longitudinal axis, a reference plane;

a plurality of transverse arms spaced apart along the longitudinal axis, each arm connecting corresponding ones of said plurality of crank pins and journals, said arms including a front arm, a middle arm, a rear arm, a forward plurality of arms disposed between said front arm and said middle arm, and a rearward plurality of arms disposed between said middle arm and said rear arm;

a front, a middle, and a rear counterweight associated with said front, middle, and rear arms, respectively, said front and rear counterweights providing oppositely directed force vectors lying in said reference plane and balancing each other;

a forward counterweight associated with one of said forward plurality of arms;

a rearward counterweight associated with one of said rearward plurality of arms, said forward counterweight, said rearward counterweight and said middle counterweight balancing each other; and at least one of said forward plurality of arms and at least one of said rearward plurality of arms being disposed in axial symmetry with each other with respect to said middle arm and having no counterweights associated therewith, wherein the improvement comprises said forward counterweight providing a force vector disposed at an angle spaced counterclockwise from and in the same quadrant as a line extending from the longitudinal axis at an angle 150 degrees clockwise from said reference plane, said rearward counterweight providing a force vector disposed at an angle spaced clockwise from and in the same quadrant as a line extending from the longitudinal axis at an angle 30 degrees clockwise from said reference plane, when the crankshaft is viewed from the front end, and wherein the force vector of the forward counterweight is disposed at an angle of 135 degrees clockwise from the reference plane and the force vector of the rearward counterweight is disposed at an angle of 45 degrees clockwise from the reference plane.

2. A crankshaft according to claim 1 wherein the counterweights of the front and rear arms are identical to each other in weight, configuration, and section modulus.

3. A crankshaft according to claim 1 wherein the counterweights of the forward and rearward arms are identical to each other in weight, configuration, and section modulus and are arranged in axial symmetry with respect to the middle arm such as to be in balance with the counterweight of the middle arm.

4. A crankshaft according to claim 1 wherein the weights of the front and rear arms, including their counterweights, are greater than the weights of the forward and rearward plurality of arms having a counterweight, including their counterweights, and the weights of the at least one of the forward and rearward arms without counterweights are less than the weights of the forward and rearward arms having a counterweight, including their counterweights.

5. A crankshaft for a six cylinder engine, the crankshaft having a front end, a rear end, and a longitudinal axis extending from said front end to said rear end, the crankshaft comprising:

at least four longitudinally spaced journals coaxial with said longitudinal axis and six crank pins having axes spaced from and parallel to said longitudinal axis, at least one crank pin being disposed longitudinally between adjacent journals, and a line between the longitudinal axis and the axis of a forwardmost one of said six crank pins defining, with said longitudinal axis, a reference plane;

nine transverse arms spaced apart along the longitudinal axis, each arm connecting corresponding ones of said crank pins and journals, said arms being numbered consecutively from one to nine from the front end of the crankshaft;

a first, a second, and a third counterweight associated with the first, fifth and ninth arms, respectively, said first and third counterweights providing oppositely directed force vectors lying in said reference plane and balancing each other;

a fourth counterweight associated with the second arm;

a fifth counterweight associated with the eighth arm, said fourth counterweight, said fifth counterweight and said second counterweight balancing each other, and said third and fourth arms and said sixth and seventh arms being disposed in axial symmetry with each other with respect to said fifth arm and having no counterweights associated therewith, wherein the improvement comprises said fourth counterweight providing a force vector disposed at an angle spaced counterclockwise from and in the same quadrant as a line extending from the longitudinal axis at an angle 150 degrees clockwise from the reference plane, and said fifth counterweight providing a force vector disposed at an angle spaced clockwise from and in the same quadrant as a line extending from the longitudinal axis at an angle 30 degrees clockwise from said reference plane, when the crankshaft is viewed from the front end, and wherein the force vector of said fourth counterweight is disposed at an angle 135 degrees clockwise from the reference plane and the force vector of said fifth counterweight is disposed at an angle 45 degrees clockwise from the reference plane.

6. A crankshaft according to claim 5 wherein the counterweights of the first and ninth arms are identical to each other in weight, configuration, and section modulus.

7. A crankshaft according to claim 5 wherein the counterweights of the second and eighth arms are identical to each other in weight, configuration, and section modulus and are arranged in axial symmetry with respect to the fifth arm such as to be in balance with the counterweight of the fifth arm.

8. A crankshaft according to claim 5 wherein the weights of the first and ninth arms, including their counterweights, are greater than the weights of the second, fifth and eighth arms, including their counterweights, and the weights of the third, fourth, sixth, and seventh arms are less than the weights of the second, fifth, and eighth arms, including their counterweights.

* * * * *